July 15, 1969     A. S. GAHIR     3,456,065
JOINTS FOR ELECTRIC CABLES

Filed May 23, 1967     2 Sheets-Sheet 2

Inventor
AUTAR SINGH GAHIR

By Webb, Burden
Robinson & Webb Attorney

United States Patent Office 3,456,065
Patented July 15, 1969

3,456,065
JOINTS FOR ELECTRIC CABLES
Avtar Singh Gahir, Kisumu, Kenya, assignor to British Insulated Callender's Cables Limited, London, England
Filed May 23, 1967, Ser. No. 640,576
Claims priority, application Great Britain, May 25, 1966, 23,296/66
Int. Cl. H02g 15/08, 15/24
U.S. Cl. 174—22     10 Claims

ABSTRACT OF THE DISCLOSURE

In a stop joint for a fluid-filled electric power cable a preformed tubular body of insulating material, which forms both part of the insulation for the joint and part of the fluid barrier separating the two halves of the joint, is sealed by a sliding joint to the periphery of a ring of insulating material which itself surrounds and is sealed to the connector by which the cable conductors are joined. In making the joint, insulation is built-up on each side of the ring around the connector to a diameter approximately equal to that of the periphery of the ring and the preformed body is then slid axially into position over the built-up insulation and the ring. A flange on the outer periphery of the preformed body can support the two halves of the joint sleeve and insulate them from each other.

---

This invention relates to stop joints for fluid-filled electric cables, that is to say cables in which the dielectric of the cable conductors connected at the joint includes a dielectric fluid, usually oil, which is free to flow along the cable. The dielectric will usually be a laminated body built-up by lapping tapes of paper or other insulating material onto the cable conductors. A stop joint is a joint which presents a barrier to the flow of the dielectric fluid from one to the other of the two cable lengths electrically connected at the joint. The invention includes the stop joint structures and cable installations incorporating stop joints made therefrom.

The invention is mainly but not exclusively concerned with joints between single core fluid-filled cables and will be described as applied to such joints. It relates to stop joints in which the barrier to the flow of the dielectric fluid comprises a connector, by which two conductors, one conductor of each of the two cable lengths, are both electrically and mechanically connected, and a preformed body of insulating material which surrounds at least part of and is indirectly sealed to the connector and is also sealed to a fluid-tight enclosure for the joint.

The connector is preferably a double ended ferrule, into each end of which one of the conductors fits provided with a central barrier to prevent oil flowing from one conductor to the other, but it may for example be a solid or hollow rod adapted to receive at each end a ferrule into which one of the conductors fits. The preformed body of insulating material surrounding the connector is preferably vacuum cast from an epoxy resin.

In the stop joint in accordance with the invention, a ring of insulating material is sealed to the connector and the preformed body surrounds this ring and makes a fluid-tight sliding joint with the periphery of the ring. The fluid-tight sliding joint is preferably formed by at least one O-ring seal located in the peripheral surface of the ring; it may alternatively be located in a groove in the surface of the bore of the preformed body or in co-operating grooves in the surface of the bore and the peripheral surface.

The ring may be a homogenous body of insulating material or a composite body made from two or more nesting rings of different insulating materials.

The preformed body preferably comprises a tube of substantially uniform bore provided with an integral peripheral flange and the fluid-tight joint enclosure preferably comprises two sleeves each extending from one side of the flange to the sheath of one of the cable lengths or to a gland sealed thereto. The tube is preferably of substantially uniform wall thickness. The ring is preferably sealed both to the connector and to the preformed body by sliding joints, for example O-ring seals. The preferred construction described in this paragraph has the advantages that the joint is simple to make and is built up from components that can easily and cheaply be manufactured.

Three forms of stop-joint for single core oil filled cables, in accordance with the invention, will hereinafter be described by way of example with reference to the accompanying drawings in which.

Figure 1:
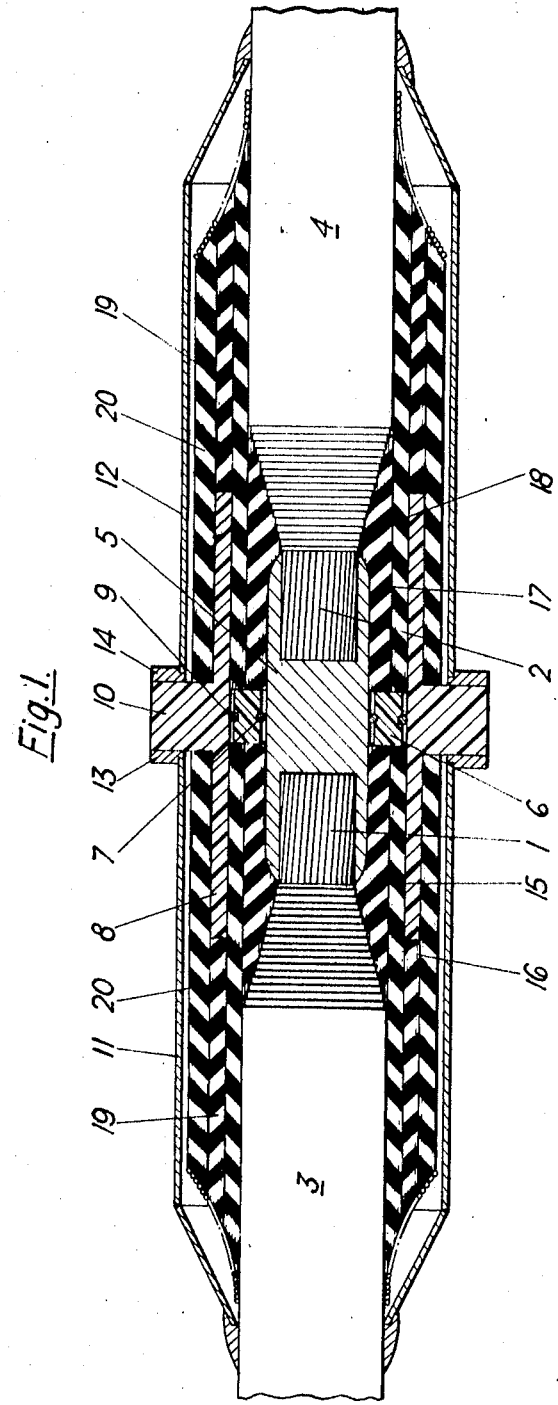
FIGURE 1 is a sectional elevation of the first form of joint.

Referring to FIGURE 1, the conductors 1 and 2 of the cable lengths 3 and 4 are connected by a double ended ferrule 5 provided with a central barrier. An insulating ring 6 of vacuum cast epoxy resin is sealed to the ferrule 5 by an O-ring seal 7, located in a groove in the surface of the bore of the ring, and a tubular preformed body 8 of uniform bore and uniform wall thickness is sealed to the ring 6 by an O-ring seal 9 located in a groove in the peripheral surface of the ring 6. The preformed body 8, which is also vacuum cast from an epoxy resin, is formed with an integral flange 10.

The fluid-tight enclosure for the joint comprises a flanged sleeve 11 extending from one side of the flange 10 to the sheath of the cable 3, to which it is sealed in the normal way, and a similar sleeve 12 extending between the other side of the flange 10 and the sheath of the cable length 4. Sleeve flanges 13 and 14 are bolted to the insulating flange 10 in such a way that the sleeves 11 and 12 are insulated from each other by the flange 10.

In making the joint, the preformed body 8 and the joint sleeves 11 and 12 and any other preformed bodies used in making the joint are threaded over the cable lengths and, after the conductors have been jointed to the connector the insulating ring 6 is slid into its final position on the connector. Insulation 15, 16 is then built up on one side of the joint, from the cable dielectric up to one side of the ring 6 to form a body of insulation having an outer cylindrical surface substantially equal in diameter to that of the peripheral surface of the ring, and similar insulation 17, 18 is built up on the other side of the joint, to the same thickness.

The preformed body 8 is now moved into a position, over these bodies of built-up insulation and the ring 6, in which its flange is bisected by the median plane of the joint. In this position it is sealed to the ring by the O-ring seal. Further insulation 19, 20 is then built up on each side of the preformed body and over the tubular part of the preformed body up to those surfaces of the flange lying parallel to the median plane, the parts of the built-up insulation further from this plane being shaped in accordance with normal practice to form stress cones. The built-up insulation referred to is preferably wholly made by directly lapping on tapes of paper or other insulating material but it can be made partly or substantially wholly from further preformed bodies of insulating material, either precast bodies or preformed rolls of insulating tape.

The two sleeves 11 and 12 forming the fluid-tight joint enclosure are finally moved into position and the inner end of each is bolted to part of the flange projecting from the built-up insulation and their outer ends are plumbed to the cable sheaths.

Figure 2:
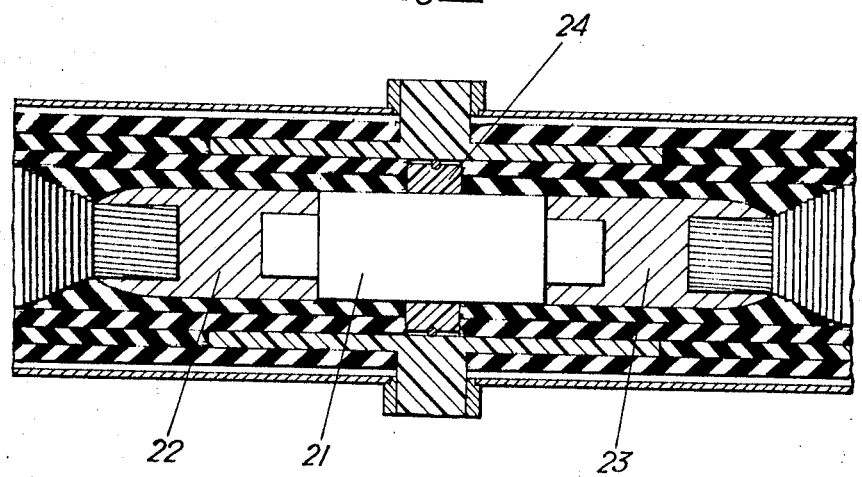
FIGURE 2 is a sectional elevation of part of the joint shown in FIGURE 1, showing the modifications incorporated in the second form of joint.

In the second form of joint, shown in FIGURE 2, instead of using a double ended ferrule as the connector, the connector is built up from a solid rod 21 and two double ended ferrules 22 and 23 compression jointed to parts of reduced diameter at the end of the rod 21. In this joint the insulating ring 24 is vacuum cast directly onto the rod 21 in such a way that it adheres to the rod. The second form of joint is otherwise identical to that shown in FIGURE 1.

The ring 24 may be cast, for example from an epoxy resin, glass or other suitable insulating material. In the third form of joint, shown in FIGURE 3, the insulating ring is built up from two nesting rings 25 and 26, the inner one 26 of which is cast on to a double ended ferrule 27 similar to that shown in FIGURE 1 and the outer one 25 of which adheres to the outer peripheral surface of the inner ring. Two or more co-axial layers of insulating material may be used, for example an inner layer of glass or ceramic material cast directly onto the connector and an outer layer of epoxy resin cast onto the glass or ceramic material. Other materials which may be used for the inner layer are oil resisting elastomers and resins, for example silicone rubber of polytetrafluoroethylene.

Figure 3:
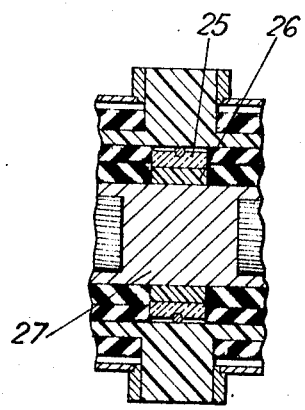
FIGURE 3 is a sectional elevation of part of the joint shown in FIGURE 1, showing the modifications incorporated in the third form of joint.

Instead of forming the ring 24 of FIGURE 2 or the inner ring 26 of FIGURE 3 in situ on the connector, it may be preformed and cemented on to the connector, this procedure being especially appropriate when it is of a ceramic material.

When the ring is a composite ring, its inner and outer peripheral parts may be sealed together in any appropriate manner, for example an inner part may be formed in situ on the connector rod and an outer part may be subsequently sealed thereto by cement or by means of an O-ring seal.

The cable conductors can be connected to a connector rod by sockets bolted to the ends of the rod instead of by ferrules compression jointed to the ends of the rod as shown in FIGURE 2. In making a joint incorporating the form of connector in which the ring is permanently secured to the connector, after the conductors have been connected to the connector, insulation is built up on both sides of the ring as before to a diameter equal to that of the peripheral surface of the ring and the subsequent procedure is as described above.

In a multi-core joint, a number of preformed bodies can be mounted in a barrier plate of insulating material which in effect forms a common flange for the three bodies and separates the two halves of the joint sleeve.

Stop joints in accordance with the invention can readily be adapted to make them suitable for use in installations in which the cable is cooled by circulating oil through the hollow conductor of the cable and through external cooling means, the oil leaving and re-entering the cable at the stop joints. In such joints the built-up insulation is preferably largely replaced by further preformed bodies, for example preformed bodies intercalated with the preformed body already referred to above, as described in United States patent application Ser. No. 640,584 filed May 23, 1967 of Avtar Singh Gahir et al., and provisions for passage of the oil to and from the cable conductors can be made as described in that application.

Where a flow of oil from the connector outwards to the joint enclosure and vice versa is required, this can alternatively be provided for by forming radial grooves in the insulating ring and longitudinal grooves in the cylindrical surface of the preformed body of insulating material making connection with radial grooves in its end faces and on the transverse faces of its flange.

The form of joint in accordance with the invention that is preferred when simplicity is the main criterion is of the kind shown in FIGURE 1, that is to say in which the connector is a simple ferrule into which the conductors fit and are compression jointed, the ferrule being provided with a central barrier, the insulating ring is sealed to the connector by an O-ring seal, and the preformed body is a tube having a uniform bore, sealed to the outer periphery of the ring by another O-ring seal, and having a uniform wall thickness, except at its centre where there is an integral outwardly projecting flange to receive the two halves of the joint sleeve.

What I claim as my invention is:

1. In a stop joint structure between two lengths of fluid-filled electric cable comprising:
   (a) a fluid-tight enclosure sealed to the cable lengths connected at the stop-joint and
   (b) a barrier to the flow of the dielectric fluid from one cable length to the other,
   the use of a barrier comprising:
   (c) a connector for both electrically and mechanically connecting a conductor of each of the two cable lengths,
   (d) a preformed body of insulating material which surrounds at least part of the connector and is sealed to the fluid-tight enclosure for the joint, and
   (e) a ring of insulating material which is sealed to the connector and is surrounded by the preformed body, the preformed body making a fluid-tight sliding joint with the periphery of the ring.

2. A stop joint structure as claimed in claim 1 in which the preformed body makes a fluid-tight sliding joint with the periphery of the ring by means of at least one O-ring seal located in at least one groove in the contiguous surfaces of the bore of the preformed body and the periphery of the ring.

3. A stop joint structure as claimed in claim 1 in which:
   (a) the preformed body comprises a tube of substantially uniform bore provided with an integral peripheral flange, and
   (b) the fluid-tight enclosure for the joint comprises two sleeves each extending from one side of the flange to the sheath of one of the cable lengths.

4. A stop joint structure as claimed in claim 3 in which the tube is of substantially uniform wall thickness.

5. A stop joint structure as claimed in claim 1 in which the ring is a composite body made from at least two nesting rings of different insulating materials.

6. A stop joint structure as claimed in claim 1 in which the connector is a double ended ferrule with a central fluid-barrier.

7. A stop joint structure as claimed in claim 1 in which at least the inner part of the ring is cast directly around the connector in such a way that it adheres to the connector.

8. A stop joint structure as claimed in claim 1 in which the ring is sealed to the connector and to the preformed body by sliding joints.

9. A stop joint structure as claimed in claim 8 in which the ring is sealed to the connector by at least one O-ring seal located in at least one groove in the contiguous surfaces of the bore of the ring and the periphery of the connector.

10. A stop joint structure as claimed in claim 1 in which the preformed body is vacuum cast from an epoxy resin.

References Cited

UNITED STATES PATENTS

| 2,093,403 | 9/1937 | Sertillange | 174—91 X |
| 2,089,052 | 8/1937 | Calvert | 174—21 X |
| 2,043,033 | 6/1936 | Capdeville | 174—22 |

LEWIS H. MYERS, Primary Examiner

A. T. GRIMLEY, Assistant Examiner

U. S. Cl X.R.

174—91